United States Patent Office 3,176,588
Patented Apr. 6, 1965

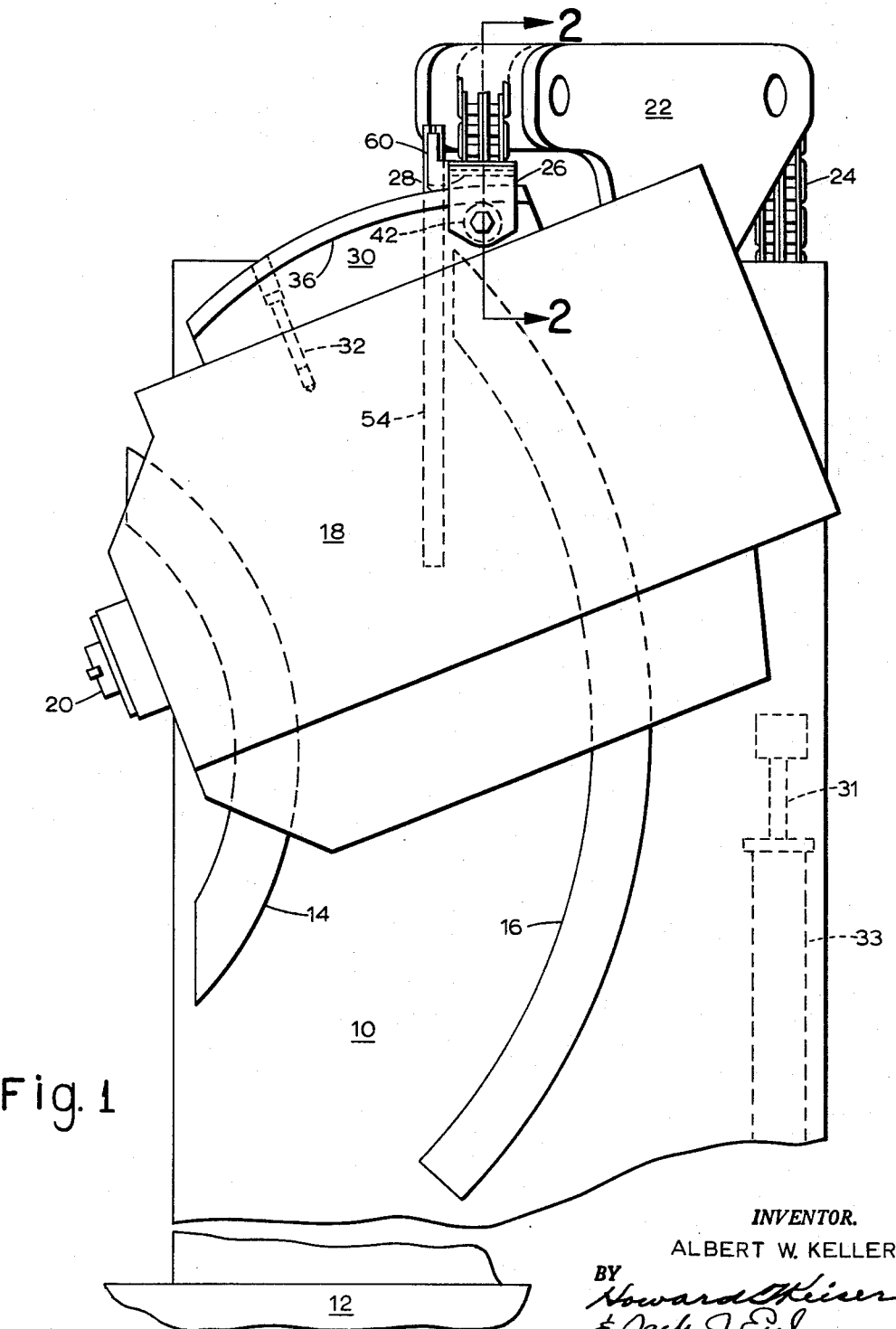

3,176,588
MACHINE TOOL COUNTERWEIGHT
Albert W. Keller, Cincinnati, Ohio, assignor to The Cincinnati Milling Machine Co., Cincinnati, Ohio, a corporation of Ohio
Filed June 27, 1962, Ser. No. 205,738
4 Claims. (Cl. 90—17)

This invention relates to a counterweight mechanism for a machine tool and more particularly to a mechanism for attaching a counterweight to a machine slide.

Modern machine tools are frequently built with provision for relative movements along and around a plurality of axes to produce complex contours on a workpiece. These machines are often very large and the movable slides are very heavy. In order to obtain smooth movement in a vertically oriented plane, the vertically movable slides must be counterweighted. When movement of these slides is other than in a straight line, the counterweighting mechanism may become complex. It is therefore an object of this invention to provide a mechanism by which a counterweight may be attached to a machine tool slide that is movable on arcuate ways fixed in a vertically oriented plane.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, a tension member is suspended from a point above a slide that is movable along vertically oriented arc-shaped ways to produce a counterweight force. The point from which the tension member is suspended does not change relative to the ways. The slide will change its angular relationship with the vertical direction however, as it is moved along the ways. To provide for a relatively movable connection of the tension member to the slide, an arc-shaped track is fixed on the slide and the tension member is connected thereto by a relatively movable terminal member. Thus as the slide is moved on the ways, the point at which the tension member is connected to the track moves therealong in accordance with the angular change of the slide as it is moved.

A clear understanding of the construction and operation of this invention will be apparent from the following detailed description in which reference is made to the attached drawings wherein:

FIG. 1 is a simplified elevational view of a machine tool column and slide.

Figure 3:
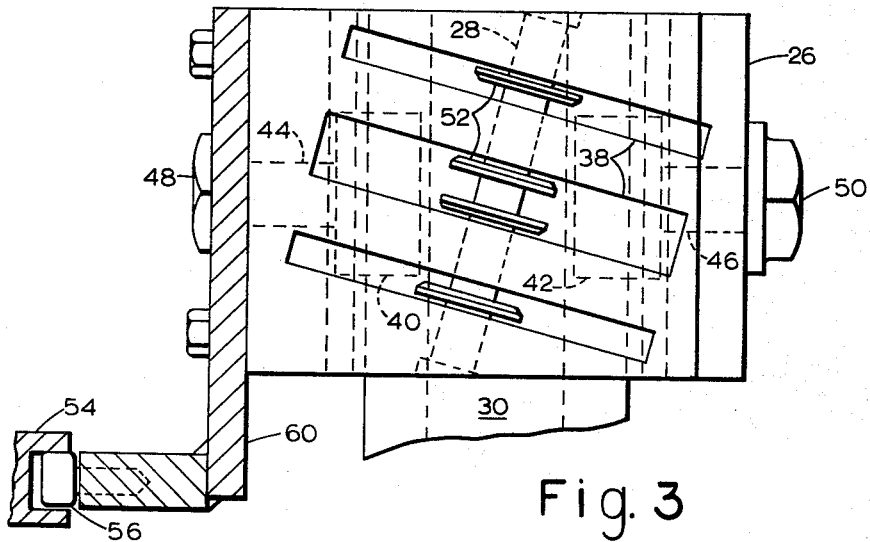
FIG. 3 is a view of the mechanism of FIG. 2 on line 3—3 thereof.

A machine tool column 10, FIG. 1, rises from a supporting member 12. The column 10 has a pair of arc-shaped ways 14, 16 fixed thereon. These ways 14, 16 are oriented in the vertical direction and a slide 18 defining a milling machine spindle carrier is slidably movable therealong to alter the angular relation of the axis on which a spindle 20 rotates with the vertical direction. The center about which the ways 14, 16 are located lies to the left of the spindle 20 and the axis on which the spindle rotates extends radially from that center. For the purposes of the description of the invention, the supporting member 12 and the ways 14, 16 are shown as being fixed. In actual practice, however, the support member 12 may, for example, be a slide movable on another member and the ways 14, 16 may be fixed on a slide member vertically movable on the column 10.

A counterweight bracket 22 is fixed on top of the column 10 and a flexible tension member, in this machine a chain 24, is received thereover on rotatable sprockets (not shown in FIG. 1 for simplicity) in a well known manner. One end of the chain 24 is suspended from a fixed location above the ways 14, 16 and a chain end fitting 26 is fixed thereon by means of a pin 28. The end fitting 26 attaches to an arcuate track member 30 that is securely fastened to the top of the slide 18 by machine screws 32 (only one shown). The other end of the chain 24 is attached to a counterweight piston 31 that is slidably received in a cylinder 33. The cylinder 33 is fixed on the back of the column 10 and produces a yielding downward pull on the back end of the chain 24 to cause it to transmit a force to the slide 18 tending to raise the slide 18 vertically. This force tends to balance the weight of the slide 18 which therefore may be moved with nearly equal ease in one direction or the other by its positioning mechanism (not shown).

Figure 2:
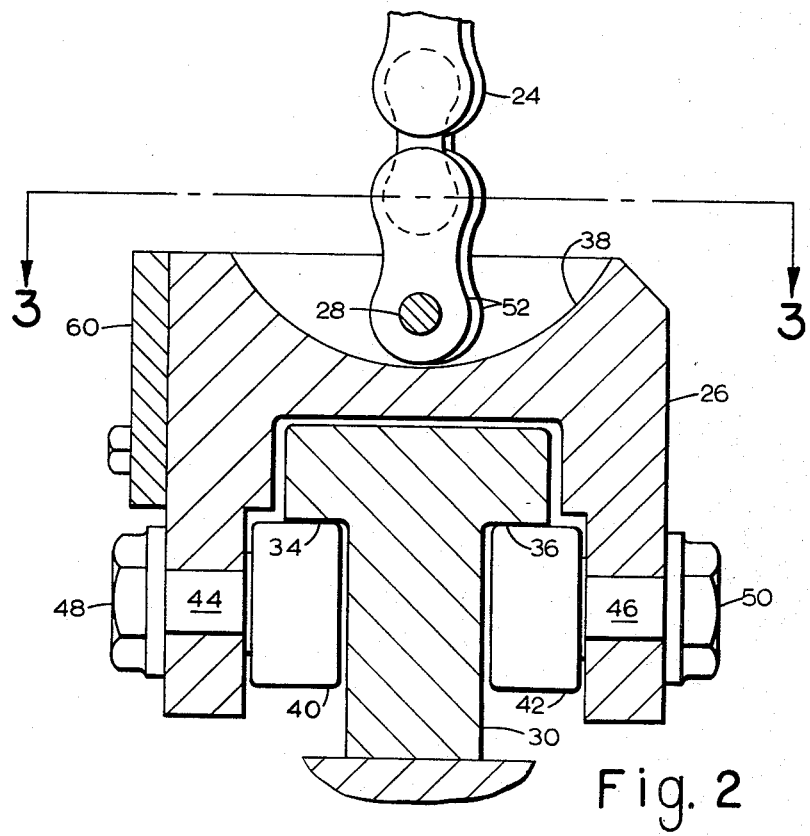
FIG. 2 is a section of FIG. 1 on line 2—2.

The end fitting 26 and track member 30 are shown in section in FIG. 2. The track member 30 is shown to be T-shaped in cross section with a pair of track surfaces 34, 36 extending along the underside thereof parallel to one another. The cross section of the end fitting 26 is generally U-shaped and inverted and embraces the track member 30. The end of the chain 24 extends into slots 38 in the end fitting 26 where it is secured by the pin 28 that passes through the chain 24 and fitting 26. The chain then, being in tension due to the pull produced by the cylinder 33, tends to pull the fitting 26 away from the track 30. Removal of the fitting 26 from the track 30 is prevented by a pair of rollers 40, 42 which are supported on axles 44, 46, respectively, that are fixed in the fitting 26 by nuts 48, 50. The rollers 40, 42 are each engaged with a surface 34, 36, respectively, of the track member 30. Therefore the tension in the chain 24 produces a lifting force on the slide 18 to which the track 30 is fixed.

Since the bracket 22 is at an angle on top of the column 10 in the described machine, the chain 24 is connected to the fitting 26 at a corresponding angle as shown in FIG. 3. The slots 38 are diagonally cut in the fitting 26 and the pin 28 which secures the chain 24 to the fitting 26 is at a right angle with the slots 38. The pin 28 passes through the ribs formed in the fitting 26 by the slots 38 and the end links 52 of the chain 24 to secure the two together.

It can be seen from FIG. 1 that the axis of the spindle 20 will swing in the clockwise direction as the slide 18 is moved downward on the ways 14, 16. At the same time, the bracket 30 will be carried downward and to the right relative to the bracket 22 on top of the column 10. Due to this rather complex motion of the bracket 30, the true shape of the curve of the track 36 would not be an arc of a circle but a curve of gradually increasing radius as traced from its right end to its left end (as viewed in FIG. 1) to maintain the highest point of the curve directly below the front of the bracket 22. This shape of the curve would tend to maintain the path of the end fitting 26 in a vertical line as the slide 18 moved. Since the curve of the track 36 must be ground to produce a smooth surface for the rollers 40, 42, the track 36 is approximated by an arc of a circle in the example shown to facilitate the grinding operation. Satisfactory results have been obtained with this arrangement and with a mechanism included to maintain the end fitting in a vertical path.

A track member 54 is fixed to the column 10 and it extends vertically therealong. The track member 54 defines a guide channel which loosely receives a pair of rollers 56, FIG. 3, along the track 54. The rollers 56 are rotatably fastened to the back side of the end fitting 26.

Therefore, as the fitting 26 is caused to move vertically with the slide 18 when it is moved along the ways 14, 16, the fitting 26 will be confined to a vertical path and the portion of the chain 24 which is suspended below the bracket 22 and above the slide 18 will be held in vertical alignment. The maintenance of the vertical path of the fitting 26 prevents a jumpy movement of the rollers 40, 42 along the surfaces 34, 36 which might otherwise occur due to the rather large radius of the curve of those surfaces and the ease of lateral deflection of the chain 24. The pull on the slide 18 by the chain 24 is also restricted to a vertically directed force. Since the arch of the tracks 34, 36 is an approximation of the true curve described, the rollers 40, 42 are not in contact at the uppermost point of the curves of those surfaces at all times but the differences are slight and there is no appreciable adverse effect on the operation of the counterweight mechanism. Therefore the counterweight force will be applied substantially constantly to the slide 18 in the vertical direction regardless of its instantaneous angular position as it moves along the arcuate ways 14, 16.

What is claimed is:
1. In a machine tool having a slide angularly adjustable in a vertical plane, a counterweight mechanism comprising:
(a) a bracket fixed to the top of said slide and having a curved track surface on an under side thereof arching away from said slide,
(b) a tension member,
(c) means to produce a force tending to move one end of said tension member vertically away from said slide, and
(d) means to secure said one end of the tension member to said track surface for movement therealong when said slide is angularly moved whereby said force is transmitted vertically through said bracket to said slide regardless of the instantaneous angular position thereof.

2. In a machine tool having a slide angularly adjustable in a vertical plane, a counterweight mechanism comprising:
(a) a bracket fixed to the top of said slide and having an arcuate track surface on an under side thereof arching away from said slide,
(b) a tension member having one end supported from a fixed location above said slide,
(c) an end fitting secured to said one end of said tension member and adapted to embrace said bracket,
(d) a roller rotatably supported in said end fitting and held in engagement with said track surface when said one end of the tension member is pulled upward whereby a force is transmitted through said bracket to said slide regardless of the instantaneous angular position thereof,
(e) means connected to said tension member to produce a force to pull said one end of the tension member upward relative to said slide, and
(f) means to confine said end fitting to a vertical path when said slide is moved whereby the force transmitted to the slide is in the vertical direction.

3. In a machine tool having a slide and a spindle supported thereby, said slide angularly movable in a vertical plane to angularly adjust said spindle relative to the vertical direction, a counterweight mechanism comprising:
(a) a bracket fixed to the top of said slide and having a pair of parallel and arcuate track surfaces on an under side thereof arching away from said slide.
(b) a tension member having one end above said slide and a portion thereof extending vertically away from said slide,
(c) means to support said vertically extending portion of the tension member from a fixed location above said slide,
(d) an end fitting secured to said one end of the tension member and embracing said bracket,
(e) a pair of rollers rotatably mounted in said end fitting, each of said rollers adapted to engage and roll on one of said track surfaces when said one end of the tension member is pulled upward to hold said rollers in contact with said track surfaces whereby a force is transmitted through said bracket to said slide regardless of the instantaneous angular position thereof,
(f) means connected to said tension member to produce a force to pull said one end of the tension member upward relative to said slide, and
(g) means to confine said end fitting to a vertical path when said slide is moved whereby the force transmitted to the slide is in the vertical direction.

4. In a machine tool having a slide and a spindle supported thereby, said slide angularly movable in a vertical plane to angularly adjust said spindle relative to the vertical direction, a counterweight mechanism comprising:
(a) a bracket fixed to the top of said slide and having a pair of parallel and arcuate track surfaces on an under side thereof arching away from said slide,
(b) a tension member having one end above said slide and a portion thereof extending vertically away from said slide,
(c) means to support said vertically extending portion of the tension member from a fixed location above said slide,
(d) an end fitting secured to said one end of the tension member and embracing said bracket,
(e) a pair of rollers rotatably mounted in said end fitting, each of said rollers adapted to engage and roll on one of said track surfaces when said one end of the tension member is pulled upward to hold said rollers in contact with said track surfaces whereby a force is transmitted through said bracket to said slide regardless of the instantaneous angular position thereof,
(f) means connected to said tension member to produce a force to pull said one end of the tension member upward relative to said slide,
(g) a fixed vertical channel member, and
(h) a bracket fixed on said end fitting having a set of rollers mounted thereon and extending into said channel member, said channel member and guide rollers operable to confine said end fitting to a vertical path whereby said force transmitted to the slide is in the vertical direction.

References Cited by the Examiner
UNITED STATES PATENTS 1,510,167  9/24  Wilhelm _____ 29—27
2,956,482  10/60 Olton _____ 77—36 X WILLIAM W. DYER, Jr., *Primary Examiner.*